Dec. 1, 1970     D. A. J. SWINKELS     3,544,373
ELECTROCHEMICAL CELL WITH LAYERED ELECTRODE OF
CERAMIC AND CARBON AND METHOD
Filed May 16, 1966
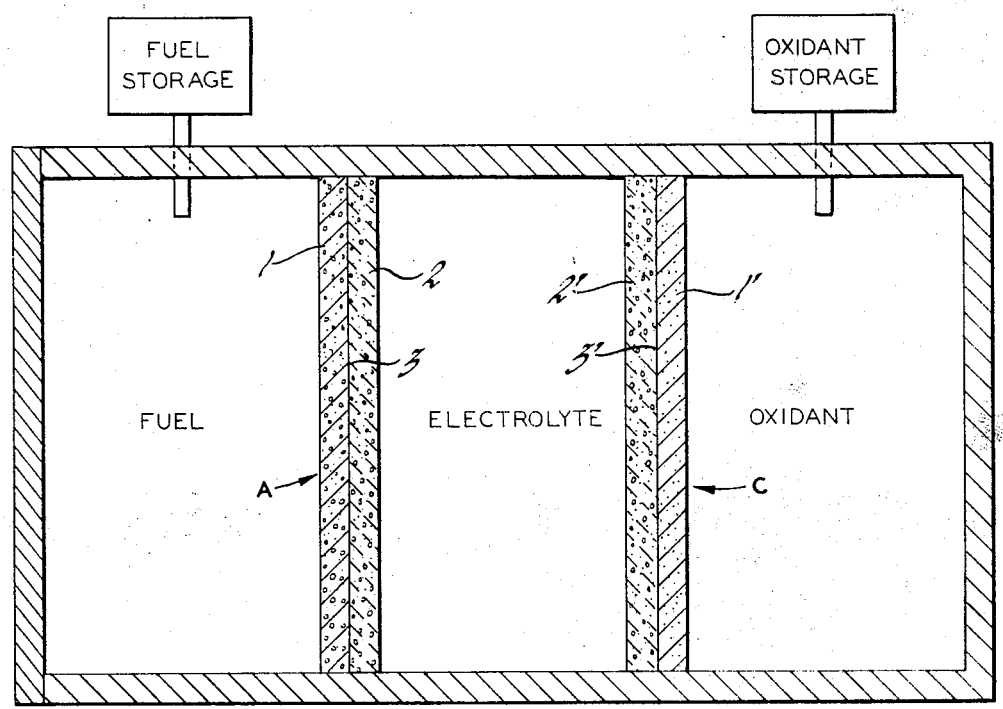
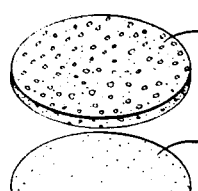
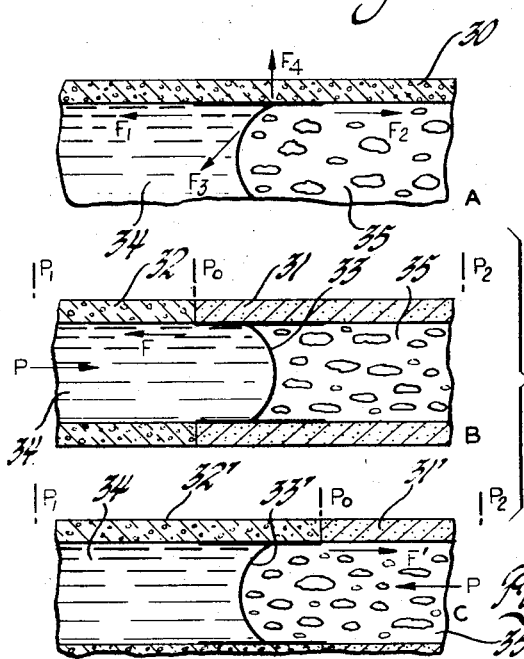
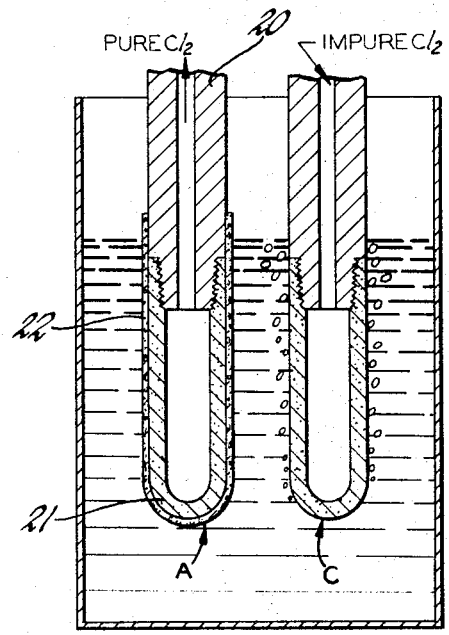
INVENTOR.
Dominicus A. J. Swinkels
BY
C. J. Wallace
ATTORNEY

United States Patent Office 3,544,373
Patented Dec. 1, 1970

3,544,373
ELECTROCHEMICAL CELL WITH LAYERED ELECTRODE OF CERAMIC AND CARBON AND METHOD
Dominicus A. J. Swinkels, Indianapolis, Ind., assignor to General Motors Corporation, Detroit, Mich., a corporation of Delaware
Filed May 16, 1966, Ser. No. 550,514
Int. Cl. C01b 7/06; H01m 27/00, 27/02
U.S. Cl. 136—86
14 Claims

ABSTRACT OF THE DISCLOSURE

An electrode for an electrochemical cell which electrode comprises at least two porous materials, one of which is electrically conductive and not wettable by the cell's electrolyte, and the other is electrically nonconductive and wettable by the cell's electrolyte. The wettable, nonconductive material faces the electrolyte. The nonwettable, conductive portion of the electrode faces the cell reactant.

---

This invention relates generally to electrodes for galvanic and electrolytic applications wherein it is necessary either to maintain the location of an electrochemical reaction interface substantially constant under varying operation conditions and/or recover one of the products of an electrolytic dissociation reaction occurring at the interface. Though other applications will become apparent, the electrode of this invention has its principal application in connection with regenerative type fuel cells. By regenerative type fuel cells, as used herein, is meant a fuel cell wherein the reactants are regenerated from the electrolyte either electrolytically or otherwise and thereby made available for reconsumption within the cell.

Prior art electrodes have employed porosity gradients, tapering pores, layers of material having different pore sizes, etc., to effect the recovery of the gaseous products of the electrolytic dissociation of an electrolyte. These electrodes have been broadly categorized as valve electrodes. These electrodes rely principally on the capillary pressure developed by the electrolyte in the small pores of the electrode to effect the valving action. As a result, the gaseous decomposition product diffuses away from the region where the dissociation takes place and out through the larger pores of the electrode where the capillary pressure is least. These electrodes have at least one inherent disadvantage. This disadvantage is the fact that the electrochemical reaction interface produced within these electrodes is differential pressure dependent and/or responsive. By this, I mean that the intensity of the differential pressure across the electrode determines the area and location of the interface over a relatively wide range. Additionally, in order to avoid flooding of the prior art electrodes, the differential pressure across the electrode must be in only one direction. Because of this one direction limitation, cells employing these electrodes frequently require complex pressure maintenance and control equipment so as to avoid fluctuations in the individual pressures of the reactants and electrolyte so as to insure a proper differential pressure across the electrode, both in terms of direction and intensity.

It is, therefore, an object of my invention to provide an electrode which will maintain the location of an electrochemical conversion interface substantially fixed under conditions where the differential pressure across the electrode fluctuates both as to intensity and/or direction, whether that electrode is undergoing either an anodic or a cathodic process.

It is another object of my invention to provide an electrode which, in addition to providing the aforementioned fixed reaction interface, provides for the controlled extraction from the reaction interface of the product of an electrolytic dissociation reaction under conditions where the differential pressure across the electrode fluctuates both as to intensity and/or direction.

It is a further object of my invention to provide an electrode comprised of at least two different materials, one of which is wet more by the electrolyte than is the other.

It is a further object of my invention to provide a fuel cell electrode comprised of at least two different materials, one of which is electrically conductive, and the other of which is nonconductive, wherein the electrically conductive material is wet more by the reactant than by the electrolyte, and the nonconductnve material is wet more by the electrolyte than by the reactant.

It is a further object of my invention to provide a process for the discharge of a fuel cell comprising the steps of supplying fuel to an anode having an electrochemical reaction interface substantially fixed within its boundaries regardless of the fluctuations in intensity or direction of the differential pressure across the electrode, supplying an oxidant to a cathode having an electrochemical reaction interface substantially fixed within its boundaries, regardless of the fluctuations in intensity or direction of the differential pressure across said electrode, and closing a circuit between the anode and the cathode to effect a useful flow of electrons from the anode to the cathode of the cell.

It is a still further object of my invention to provide a process for the recovery of at least one of the products of the electrolytic dissociation reaction of an electrolyte which is situate between and in contact with an anode and a cathode which holds the reaction interface substantially within its boundaries, regardless of the fluctuations in intensity or direction of the differential pressure existing across the electrode, and which by its very nature urges the flow of the dissociation products away from the electrolyte, comprising the steps of applying current to the anode and cathode to electrolytically dissociate the electrolyte, extracting the dissociation product from the region of the dissociation by means of said electrode and recovering the product of dissociation.

It is a still further object of my invention to provide a process for the recharging of a fuel cell having an electrolyte which is substantially the product of the cell's reactants situate between and in contact with an anode and a cathode, which hold the location of the reaction interface substantially within their boundaries, regardless of the intensity or direction of differential pressure existing across them and which by their wetting propensities with respect to the electrolyte and dissociation product urge the flow of the dissociation product away from the electrolyte, comprising the steps of applying current to the anode and cathode to electrolytically dissociate the electrolyte within the confines of the fuel cell and in substantially the same region where the electrolyte was electrochemically formed during discharge of the fuel cell, extracting the dissociation products from the regions of the dissociation by means of the anode and cathode, as appropriate, and recovering the products of dissociation for subsequent reconsumption within the cell.

It is a still further object of my invention to provide a process for the purification of a gas comprising the steps of supplying the impure gas to the cathode of an electrolytic cell, which cell contains an electrolyte which is an electrolytically decomposable compound of said gas, providing an anode which holds the location of the reaction interface substantially constant within its boundaries regardless of the intensity or direction of the differential pressure existing across it and which by its wetting propensities with respect to the electrolyte and dissociation product urges the dissociation product to be recovered to flow away from the electrolyte, applying a current to the anode and cathode, and recovering the pure gas at the anode.

It is a still further object of my invention to provide a process for the fabrication of electrodes having at least two surfaces, each comprised of a different material, one of which is preferentially wet by the cell's electrolyte, and the other of which is preferentially wet by the cell's reactant.

These and other objects of my invention will become apparent upon a more detailed description which follows.

FIG. 1 is a schematic representation of a fuel cell employing the electrodes of my invention.

FIG. 2 is a representation of one way of fabricating electrodes within the scope of my invention.

FIG. 3 is a schematic representation of a gas purification cell employing another electrode, which has been fabricated in another way.

FIG. 4 is a pictorial representation of the physical relationships occurring within my electrode under different operating conditions.

Briefly stated, my invention involves an electrode comprised of at least two layers of different materials, having different wettabilities with respect to the cell's electrolyte. One of the materials is preferably electrically nonconductive and is more wettable by the electrolyte than the other material, which is electrically conductive and is less wettable by the electrolyte. However, in a system where the other interface forming fluid (i.e. non-electrolyte) is itself conductive (i.e. a metal), the layer which is less wettable by the electrolyte need not be conductive. The electrode of my invention is designed to work in a system wherein the wetting propensities of the electrolyte are such as to wet the nonconducting surface of the electrode more than the conducting surface of the electrode. By wetting propensities of a particular fluid, I mean those properties of the fluid which tend to make it wet the surface of one material more than that of another such that the ratio of the wetting characteristic (contact angle) of that fluid with respect to the one material to the wetting characteristic (contact angle) of that fluid with respect to the other material is less than unity. As a practical matter for reasonable differential pressure tolerances, the wetting propensities should be less than 0.75 and preferably no more than 0.5. The benefits derivable from my electrode can be further enhanced if the wetting propensities of the reactants are opposite that of the electrolyte with respect to the same materials. For these electrodes it is preferable to have a cell system wherein the electrolyte has a wetting affinity (i.e. contact angle of less than 90°) for one material (i.e. the nonconductor), and a wetting repugnance (i.e. contact angle of more than 90°) for the other material, and the respective reactants have either opposite or negligible (e.g. a gas) wetting affinities and repugnancies for the same materials. The greater the difference between the respective contact angles, the better my electrode performs. At least a 30° contact angle difference is necessary to obtain a pressure differential tolerance of practical value. I prefer a contact angle difference of at least 90° or more. Capitalizing upon these wetting propensities, electrodes are designed in accordance with my invention so as to effect an electrochemical reaction interface, the location of which will remain substantially fixed within the boundaries of the electrode, regardless of fluctuations in the intensity and/or direction of the differential pressure across the electrode, while undergoing either anodic or cathodic processes. Additionally, electrodes designed in accordance with my invention establish a direction of flow for the products of an electrolytic decomposition of the electrolyte which are formed when applying an outside source of current to the cell (e.g. recharging a fuel cell system).

Though there is no intent to limit myself to a particular environment, the following detailed discussion will be in terms of a $Li/LiCl/Cl_2$ fuel cell system under conditions of both discharge and recharge.

FIG. 1 is a schematic representation of a fuel cell employing electrodes A and C constructed in accordance with my invention. Electrode A corresponds to the anode, and electrode C corresponds to the cathode of the aforementioned cell. In the $Li/LiCl/Cl_2$ system, lithium is the fuel, lithium chloride the electrolyte, and chlorine the oxidant. The anode A is comprised of two layers of different materials having the aforementioned wettability properties. An electrically conductive, porous material 1, such as stainless steel, which is wettable by the lithium, forms that portion of the electrode which is in contact with the lithium. Any chemically inert high temperature material having the requisite wettability characteristics is acceptable here. A porous electrically nonconductive material 2 such as AlN, which is wettable by the lithium chloride, forms that portion of the electrode which is in contact with the lithium chloride. While pure AlN is preferred, a less pure material may be used for most applications. A material containing 95% AlN and 5% SiC known as Cerac-4 and produced by Cerac, Inc. appears to be satisfactory. An electrochemical reaction interface is effected in the region about the junction 3 between the conductor 1 and the insulator 2. The nature of the interface and its response to various operating conditions will be discussed hereinafter in conjunction with FIG. 4. Similarly, cathode C is comprised of two layers of different materials having the aforementioned wettable properties, except for the fact that here the wetting propensities of the reactant, chlorine, are negligible. An electrically conductive porous material 1', such as carbon or graphite, which is not wet by the lithium chloride, forms that portion of the electrode which is in contact with the chlorine. Any chemical inert high temperature conductive material having the requisite wettability characteristics is acceptable here. A porous, electrically nonconductive material 2', such as beryllia, alumina or magnesia, which is wettable by the lithium chloride, forms that portion of the electrode which is in contact with the lithium chloride. An electrochemical reaction interface is effected in the region about the junction 3' between the conductor 1' and the insulator 2'. The nature of the interface and its response to various operating conditions will be discussed hereinafter in conjunction with FIG. 4.

The important aspect of this invention resides in the substantial fixation of the location of the electrochemical reaction interface within the boundaries of the electrode. This is done by providing within the electrode a junction between two materials having different wettability properties with respect to the cell's electrolyte and preferably also the reactants. A variety of ways for producing this junction are possible. Hence, as shown in FIG. 2, the different materials 11 and 12 may be merely juxtaposed. An advantage of this method resides in being better able to know and control the porosity and pore size distribution of both pieces before assembly. However, electrodes constructed in this fashion tend to show a high resistance. This results apparently from the fact that a less intimate contact between the graphite and ceramic is obtained than otherwise might be obtained from the preferred process of fabrication, which will be discussed hereafter. The mere juxtaposing of the materials appears to permit a layer of gas to form between the electrolyte wetted ceramic and the electrolyte non-wetted graphite electrode. This reduces the effective electrode area and increases the effective resistance. Hence, a more intimate junction between the ceramic and graphite is desirable. A particularly effective way of producing this intimate junction comprises flame or plasma spraying the ceramic onto the carbon electrode (see FIG. 3). The anode A of FIG. 3 comprises a dense carbon cylinder 20 which serves to conduct the chlorine from the porous carbon portion 21 which serves as the actual electrode surface. The carbon cylinder 20 additionally performs the function of an electrical conductor. A plasma sprade coating of beryllia forms a layer 22 about the external surface of the entire structure. While it is necessary only to spray the active electrode surface, i.e., porous carbon portion 21, it is desirable to spray the entire electrode, or at least that portion which is below the surface of the electrolyte. When the cylinder 20 is also coated, the generation of chlorine on its periphery when recharging is substantially eliminated and chlorine regeneration and recovery is restricted to the portion 21. Plasma sprayed beryllia coatings are preferred over other types of coatings which might be employed, i.e., flame sprayed alumina or magnesia. Plasma sprayed beryllia generally produces smaller pores than the flame sprayer alumina. If all other factors are equal, smaller pores permit the electrode to withstand higher pressure differentials. Though generally the sprayed ceramics produce coatings having lower porosity and a rather wide distribution of pore sizes than do the electrodes produced by juxtaposing the respective materials, a more intimate junction between the ceramic and carbon is formed. This intimate junction effectively reduces the electrode's resistance and in general produces an overall better electrode. Of course, the electrodes A and C of FIG. 1 are preferably prepared using the aforesaid spray application of the ceramic. In preparing the electrodes, the porous carbon or graphite is formed into the desired size and shape by standard manufacturing techniques and, where appropriate, affixed to a dense carbon member in any acceptable manner. Those portions of the electrode structure which are not intended to be coated with porous ceramic are masked off with any suitable parting agent capable of withstanding the temperature involved. Beryllia powder having the requisite purity and particle size is fed to a plasma spray gun from which it emanates to form the electrode hereinafter described.

In a $Li/LiCl/Cl_2$ system which is operable at temperatures of about 608° C., and overall pressures of from 0-20 atmospheres, chlorine electrodes can be constructed which will withstand differential pressures of about 0-10 p.s.i. and capacitate chlorine flow rates of up to 160 standard cc./min./cm.$^2$ of electrode area. Electrodes capable of operating within the aforesaid ranges can be fabricated using 80-100% pure carbon as the nonwettable layer. The carbon will have a porosity of about 30-70%, pore diameters of about 0.03-100 microns and a thickness of about 0.05-0.5″. Similarly, the wettable ceramic layer, i.e., beryllia, alumina, or magnesia, will have a purity of 80-100%, a porosity of 10-50%, a pore diameter in the order of 0.05-20 microns, and a layer thickness of about 0.01-0.2″.

EXAMPLE

An electrode comprising:

(1) Carbon (Pure Carbon Co.—grade FC-11)
  (a) Purity; about 99%
  (b) Porosity: about 35%
  (c) Thickness: about 0.125″
  (d) Pore diameter distribution: about 0.1-10 microns
  (e) Contact angle: about 150°

(2) Plasma sprayed BeO Layer
  (a) Purity: about 99%
  (b) Porosity: about 15%
  (c) Thickness: about 0.04″
  (d) Pore diameter distribution: about 0.1-1 micron
  (e) Contact angle: about 30° is satisfactorily employed in a $Li/LiCl/Cl_2$ system designed to operate as follows:

(1) Temperature: about 610-650° C
(2) Total pressure: about 1.5 atmospheres
(3) Differential pressure across electrode: about 1.0 p.s.i.
(4) $Cl_2$ flow rate: about 25 standard cc./min./cm.$^2$ The preceding discussion has been primarily restricted to the fabrication of a chlorine electrode in a $Li/LiCl/Cl_2$ system. However, a similar type electrode may be constructed for use with the lithium whereibn the electrode serves to maintain a liquid-liquid electrochemical reaction interface, rather than a liquid-gas electrochemical reaction interface. In this connection, the electrically conductive layer may be porous stainless steel, which is wet more by the molten lithium than by the fused lithium chloride, and the insulator layer may be porous aluminum nitride, which is wet more by the lithium chloride than the lithium. The aluminum nitride is preferred for use with the lithium electrode because it is more inert to attack by the lithium than are the other ceramics.

In addition to its use as a reversible fuel cell electrode, I have found that the electrode of my invention permits me to purify an otherwise impure gas (e.g. $Cl_2$). Hence, as shown in FIG. 3 commercial grade $Cl_2$ containing about 99.5% $Cl_2$ is introduced into the cathode C. The electrolyte is molten lithium chloride. Current is applied to the cell and pure $Cl_2$ is generated at the anode A. The anode A is constructed according to the teachings of my invention. The $Cl_2$ generated at the anode has an average $CO_2$ content of 14 p.p.m. and air content of 24 p.p.m. The purified $Cl_2$ thus produced compares superiorly with research grade $Cl_2$ (e.g. Matheson) wherein the average $CO_2$ content is reported to be greater than 200 p.p.m. and the average air content is reported to be greater than 150 p.p.m.

While I do not intend to be restricted to a particular theory, it is postulated that the physical mechanism which effects the relative fixation of the electrochemical reaction interface is as discussed hereafter.

FIG. 4 is a pictorial representation of the forces acting upon the electrochemical reaction interface, the location of which is substantially fixed within the boundaries of my electrode.

FIG. 4a shows a solid wall 30, a liquid 34, a gas 35 and the resultant films existent between any two of the three phases. Each film has its own distinct interfacial tension. The resultant of the forces incident to the interfacial tensions of the films at the point where the phases meet determines the exact location of the three phase junction with respect to the wall 30. FIG. 4a is representative of a typical situation wherein the liquid 34 wets the solid 30. The forces exerted by the interfacial films are such that the solid-vapor film force $F_2$ is greater than the resultant of forces exerted by the solid-liquid film and the vapor-liquid film $F_1$ and $F_3$ respectively. Conversely, when a liquid such as 34 does not wet a solid such as 30, the force incident to the solid-liquid film $F_1$ is greater than the resultant force of the solid-vapor and vapor-liquid films $F_2$ and $F_3$ respectively.

FIG. 4b depicts a situation wherein a pressure differential in the direction of the gas 35 establishes an electrochemical reaction interface 33 between the liquid 34 and gas 35. This electrochemical reaction interface 33 will remain substantially fixed as long as the net resultant force F is not exceeded by the differential pressure opposing it thereby causing flooding of the electrode. When the differential pressure is in the direction of the gas, the three phased interface tends to be located within the confines of a nonwettable pore 31. On the other hand, FIG. 4c depicts a situation wherein a pressure differential in the direction of the liquid 34 establishes an electrochemical reaction interface 33′ between the liquid 34 and gas 35. This electrochemical reaction interface 33′ will remain substantially fixed as long as the net resultant force F′ is not exceeded by the differential pressure opposing it thereby causing gassing of the electrode. FIG. 4c is representative of the normal operating condition of a discharging fuel cell. When the differential pressure is in the direction of the liquid, the three phase interface tends to be located within the confines of a wettable pore 32′. Hence, although the electrochemical reaction interface is substantially fixed within the confines of the electrode, and more specifically within the region about the junction between the wettable 32 and nonwettable 31 portions of the electrode, it does, in fact, fluctuate therein much like a diaphragm depending upon the intensity and/or direction of the differential pressure across the electrode. Obviously, when the intensity of the differential pressure is in excess of the resultant interfacial tension forces resisting it, the electrode will flood or gas, as appropriate, depending upon the direction of the differential pressure. A proper selection of the pore sizes considered in conjunction with the relative wettabilities of the respective materials permits the fabrication of electrodes capable of withstanding substantial differential pressure fluctuations. The electrode can withstand differential pressures in either direction. These differential pressures fluctuate between the limits of the pressure required to flood the electrode on the one hand and the pressure required to gas the electrode on the other. The total differential pressure intensity tolerance of the electrode then is the summation of the differential pressure $P_0-P_1$ and the differential pressure $P_0-P_2$ which at their respective permissible maximum correspond to the gassing and flooding differential pressures.

The electrode of my invention, therefore, may be used to effect and maintain either a liquid-liquid interface or a liquid-gas interface. Where a liquid-liquid interface is desired, the aforementioned electrolyte and reactant wetting propensities are preferred. In the case of a liquid-gas interface the wetting propensities of the gas for either material is, of course, negligible. However, as long as the forces resulting from the wetting propensities of the electrolyte with respect to the different materials which comprise my electrode are sufficiently strong, in and of themselves, there is no need for the added benefit of the reactant's wetting propensities. However, where the reactant does have favorable wetting propensities, it is of course beneficial, because it provides a complementary force which enhances the differential pressure tolerance of the electrode. Hence, while not absolutely necessary, it is beneficial and preferred to select materials which have substantial opposite wettabilities with respect to the electrolyte and reactants.

Therefore, though my invention has been described in terms of certain preferred embodiments, it is to be understood that others may be adapted and that the scope of my invention is not limited except by the appended claims.

What is claimed is:

1. In an electrochemical cell having a fused electrolyte consisting essentially of an alkali metal halide and at least one halogen reactant, the improvement comprising an electrochemical reaction interface-fixing electrode comprising at least two different porous materials having a junction therebetween, wherein said materials have opposite wettabilities with respect to said fused electrolyte, the one of said materials facing said fused electrolyte consisting essentially of an electrically nonconductive ceramic material which is wettable by said fused electrolyte, the other of said materials facing said reactant consisting essentially of an electrically conductive carbon which is not wettable by said fused electrolyte there being between said materials a contact angle difference with respect to said fused electrolyte of at least about 30°, said ceramic holding said fused electrolyte within its interstitial voids by surface tension and resisting the substantial ingress therein of said halogen, and said other porous material having said halogen within its interstitial voids and resisting the substantial ingress therein of said fused electrolyte, whereby an electrochemical reaction interface is substantially fixed at the locus of said junction.

2. The cell as defined in claim 1 wherein said contact angle difference is at least 90°.

3. A galvanic cell having at least one halogen reactant, a fused electrolyte consisting essentially of an alkali metal halide and an electrochemical reaction interface-fixing electrode situate between said halogen and said halide wherein said electrode comprises at least two different porous materials having a junction therebetween, said materials having opposite wettabilities with respect to said fused electrolyte, one of said materials being an electrically nonconductive ceramic wettable by said fused electrolyte, the other of said materials being carbon which is not wettable by said fused electrolyte, a difference of at least about 30° between the contact angle of said fused electrolyte with respect to said ceramic and the contact angle of said fused electrolyte with respect to said carbon, said ceramic facing said electrolyte and holding said fused electrolyte within its interstitial voids by surface tension and resisting the substantial ingress therein of said halogen and said carbon facing and having said halogen within its interstitial voids and resisting the substantial ingress therein of said fused electrolyte, whereby an electrochemical reaction interface is substantially fixed at the locus of said junction.

4. The device as claimed in claim 3 wherein said galvanic cell is an alkali metal/alkali metal halide/halogen cell.

5. The cell as claimed in claim 4 wherein said fuel cell is a $Li/LiCl/Cl_2$ fuel and said contact angle difference is at least about 90°.

6. The cell as claimed in claim 5 wherein said electrode is situate between said lithium chloride and said chlorine and said ceramic is selected from the group consisting of beryllia, magnesia, alumina, and aluminum nitride.

7. The cell as claimed in claim 6 wherein said ceramic is a coating on the surface of said other material.

8. The cell as claimed in claim 7 wherein said ceramic has a porosity of about 10–50%, pore diameters of about 0.05–20 microns and a thickness of about 0.01–0.2".

9. The cell as claimed in claim 5 wherein said carbon has a porosity of about 30–70%, pore diameters of about 0.03–100 microns and a thickness of about 0.05–0.5".

10. A process for operating an electrochemical system having at least one halogen reactant and a fused electrolyte consisting essentially of an alkali metal halide, said process comprising the steps of positioning an electrode in said cell between said fused electrolyte and said halogen, said electrode having a first layer of nonconducting, porous, electrolyte-wettable ceramic facing said fused electrolyte, a second layer of conducting, porous, electrolyte-nonwettable carbon facing said halogen and a junction between said layers, filling the interstitial voids of said ceramic with said fused electrolyte, holding said fused electrolyte within said interstitial voids by surface tension, filling the interstitial voids of said carbon with said halogen, establishing an electrochemical reaction interface between said halogen and said fused electrolyte within said electrode which interface remains substantially fixed in the region of said junction under conditions where the differential pressure across said interface fluctuates, both as to intensity and direction, providing a counterelectrode and establishing a potential difference between said electrode and said counterelectrode.

11. The process as defined in claim 10 wherein said potential difference is established by applying an external source of potential.

12. The process as defined in claim 11 wherein said process is a process for recharging a galvanic cell.

13. The process as defined in claim 11 wherein said process is a process for the purification of halogen wherein said halogen, in an impure state, is supplied to said counterelectrode and pure halogen is generated at said electrode.

14. The process as defined in claim 10 wherein said process is for the generation of electrical current wherein said potential difference is established by introducing said gaseous reactant at said electrode, introducing at said counterelectrode another reactant having a different electropotential than said gaseous reactant, and closing an extenral circuit between said electrode and said counterelectrode.

References Cited
UNITED STATES PATENTS

| | | | |
|---|---|---|---|
| 2,921,110 | 1/1960 | Crowley et al. | 136—86 |
| 3,260,620 | 7/1966 | Gruber | 136—86 |
| 3,337,369 | 8/1967 | Frazier | 136—86 |
| 3,400,054 | 9/1968 | Ruka et al. | 136—86 |
| 3,407,094 | 10/1968 | Juda | 136—86 |
| 3,116,170 | 12/1963 | Williams et al. | 136—86 |
| 3,201,282 | 8/1965 | Justi et al. | 136—86 |
| 3,214,296 | 10/1965 | Smatko | 136—86 X |
| 3,274,029 | 9/1966 | Lurie et al. | 136—86 |
| 3,276,909 | 10/1966 | Moos | 136—86 |

FOREIGN PATENTS 1,386,878  12/1964  France.

OTHER REFERENCES

Hunger et al., in 3rd Status Report on Fuel Cells, Oct. 12, 1962, A.D. 286686, front page and pp. 31 & 32.

ALLEN B. CURTIS, Primary Examiner

U.S. Cl. X.R.

204—128, 129, 130.

PO-1050
(5/69)

UNITED STATES PATENT OFFICE
CERTIFICATE OF CORRECTION

Patent No. 3,544,373          Dated December 1, 1970

Inventor(s) Dominicus A.J. Swinkels

It is certified that error appears in the above-identified patent and that said Letters Patent are hereby corrected as shown below:

Column 8, Claim 5, Line 25, "fuel" should read -- cell --.

Signed and sealed this 26th day of October 1971.

(SEAL)
Attest:

EDWARD M. FLETCHER, JR.    ROBERT GOTTSCHALK
Attesting Officer            Acting Commissioner of Patents